Dec. 15, 1953

G. W. McINTIRE 2,662,332

INSECTICIDE FOGGER

Filed Oct. 16, 1950

INVENTOR
George W. McIntire.

BY

ATTORNEY

Patented Dec. 15, 1953

2,662,332

UNITED STATES PATENT OFFICE 2,662,332

INSECTICIDE FOGGER

George W. McIntire, Hagerstown, Md.

Application October 16, 1950, Serial No. 190,373

3 Claims. (Cl. 43—129)

The present invention relates to insecticide fog producers.

It is an object of the invention to provide a relatively smaller and more compact insecticide fog producer than heretofore known to the prior art, whereby the same is readily portable.

Another object is to provide an efficient insecticide fog producer comprised of a few standard parts, which are readily assembled and replaced, whereby economy and durability are promoted.

With the above and other objects in view which will be apparent as the description proceeds, the invention comprises the novel construction, combination and arrangement of parts hereinafter described and illustrated in the accompanying drawing.

In the drawing, wherein like reference characters refer to like parts throughout the specification, Figure 1 is a side isometric view of the unit comprising this invention.

Figure 1:
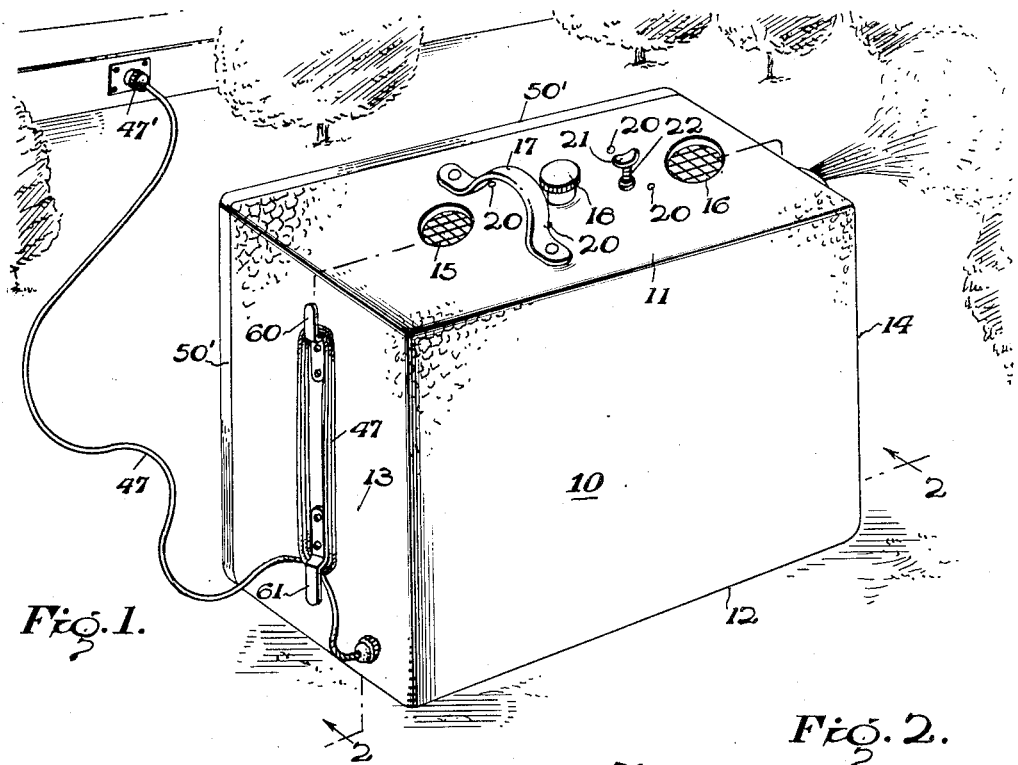
Figure 2:
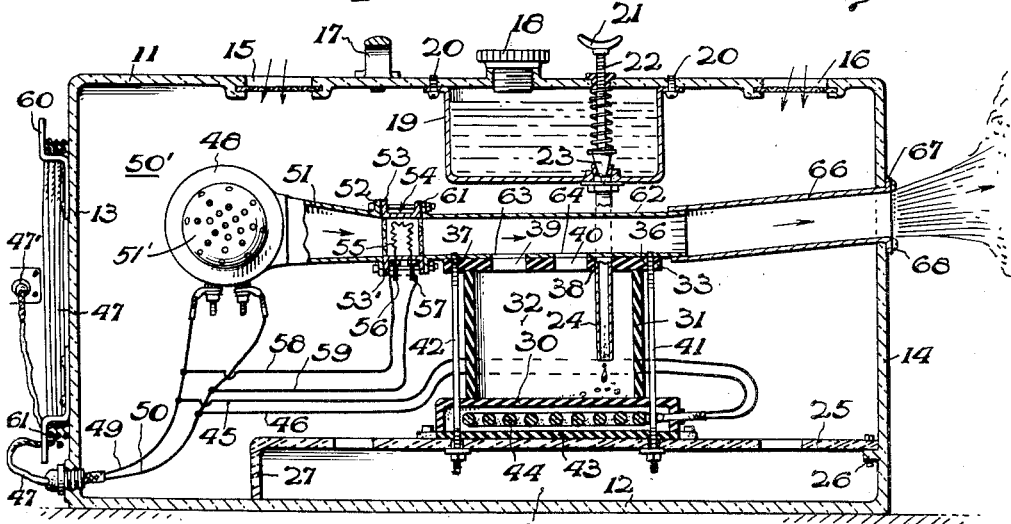
Fig. 2 is a longitudinal cross section view of the device on the section line 2—2 of Figure 1.
Figure 3:
Figure 3 is a top plan view of the mixing tube and vaporizing chamber shown in cross section in Figure 2.

Referring to the drawing the apparatus comprises a casing 10 shown in Figures 1 and 2 to be of rectangular form with a top wall 11, bottom wall 12, a rear end wall 13, a front end wall 14, and the necessary side walls. The top wall 11 is formed with longitudinally spaced screened air openings 15 and 16, a carrying handle 17, an insecticide inlet screw cap 18 for an insecticide reservoir tank 19 secured by means, such as bolts 20, and the handle 21 of a threaded needle valve stem 22. Formed at the opposite end of the stem inside the insecticide reservoir is a needle valve body 23, see Fig. 2.

The needle valve 23 seats in the open end of an insecticide feed or dispenser tube 24. The tube 24 is suitably coupled in the bottom wall of the reservoir tank 19 by a fluid seal coupling nut and extends vertically downward part way toward the bottom 12 of the casing. Supported above the bottom 12 is a base board 25 preferably of asbestos. A lug 26 formed from the interior lower end of the front end wall 14 of the casing and a downward extending flange 27 serve to support the board above the bottom 12, so as to leave an air space 28.

Fixed to the support board 25 is a heater for vaporizing the insecticide dispensed from the tube 24, which tube extends to a point just above the heated rectangular plate 30. Plate 30 supports a cylinder 31 thus forming a vaporizing chamber 32.

Mounted on the top rim of the cylinder 31 is a rectangular plate 33 formed with threaded bolt openings 34, 35, 36 and 37 in each corner, an axially offset opening 38 through which extends the dispensing tube 24, and a pair of longitudinally aligned aspirating openings 39 and 40, see Figure 2. The bolt openings receive elongated bolts, such as 41, and 42, shown in Figure 2. The bolts extend upward through openings in the base board 25, and the spaced apart heating element plates 43 and 30. The heating element may be the usual resistance coil 44 and it connects through power leads 45 and 46 to the leads in a main electric power cord 47 with a suitable plug-in connection 47'. Connected by leads 49 and 50 to the heater element is an electric blower 48. The blower includes the usual air intake 51' and fan with an air outlet duct 51. The mouth of the duct 51 is formed with an apertured coupling flange 52, the apertures of which register in alignment with a similar coupling flange 53 of a small heater unit 54. The unit 54 is formed like a bolted flange type pipe union having a second apertured flange 53' with a resistance coil 55 therein and terminals 56 and 57 connected in parallel with the main heater element 44 by leads 58 and 59 to leads 49 and 50 of the main power cable 47.

On the rear end wall 13 are mounted main power cable winding brackets 60 and 61. These brackets are particularly useful as a very long power cable may sometimes be desired. The pipe union heater unit 54 couples between the flanged end 52 of the blower mouth and the flanged end 61 of an elongated mixing tube 62 formed with a pair of axially aligned aspiration openings 63 and 64. This mixing tube 62 is welded to the rectangular plate 33 so that the openings 63 and 64 register over the aspirating openings 39 and 40. The mixing tube 62 projects beyond the plate 33 and has its fluted end engaged within and coupled to the end bore of an exhaust tube 66. The exhaust tube serves to discharge the fog or mist from the air and insecticide vapor mixing tube 62 and is mounted in an aperture in the front end wall 14 of the casing by a flange 67 and bolts 68.

It will now be seen that a distinctive feature of the invention is the provision of a portable device including a casing having all of the mechanism enclosed, including the fan and the fogging unit, the said casing having openings providing free access of the fan to the outside atmosphere. The fogging unit is so constructed and arranged that it may be dismantled, when desired, for inspection, repair or replacement. In that connection, one of the sides 50' of the casing is made detachable to serve as an access door.

Another feature of the invention resides in blowing pre-heated air over the aspirating outlets of the fogging unit. In that way complete vaporization of the insecticide is insured and eliminates the possibility of condensation of the insecticide vapor as it is aspirated from the fogging chamber. Thus, it is possible to effectually operate the present unit under conditions where the relative humidity in the air is abnormally high.

*Operation*

The use of the device is probably clear from the foregoing description, but briefly the plug 47' is connected to a source of electric power and the blower 48, main heater 44 and auxiliary pre-heater are each energized. The blower now forces air through the mixing tube 62 and by aspiration draws vapors of insecticide from within the chamber 32. Adjustment of the proper feed of insecticide has been made by setting the needle valve 23 and as the drops of vaporizable insecticide strike the hot plate 30 the chamber 32 becomes charged with such vapors. The blower air and vapors mixed in tube 62 are blown into and out of exhaust tube 66 in a fine mist or fog.

Without further description it is believed that the present invention is clearly understandable to others desiring to practice the same. While only one embodiment of the invention is described and illustrated in detail, it is to be expressly understood that other combinations, modifications and arrangements of the parts which will now probably occur to others skilled in the art are to be considered a part thereof. To determine the scope of my invention, reference should be had to the appended claims.

What is claimed is:

1. A portable insecticide fog producer comprising a casing having air intake openings and a top wall provided with a bushing, an insecticide reservoir supported from the interior side of the top of the casing between said openings, a dispensing tube connected to the bottom of the said reservoir and extending vertically from the interior of the reservoir and part way toward the bottom of said casing, a needle valve inside the end of the dispensing tube in the reservoir, a threaded valve stem for said needle valve threaded in said bushing in the top wall of the casing for adjusting the valve to regulate the discharge of insecticide to be changed into fog, fog generating means positioned in the casing comprising a heated plate for vaporizing insecticide delivered thereto from said tube, and means for discharging said vaporized insecticide by aspiration from the casing as an insecticide fog.

2. A portable insecticide fog producer comprising a casing having a top wall provided with a bushing and air intake openings formed in said top wall, an insecticide reservoir supported from the interior side of the top wall of the casing between said openings, a dispensing tube connected to the bottom of the said reservoir and extending vertically from the interior of the reservoir and part way toward the bottom of said casing, a needle valve inside the end of the dispensing tube in the reservoir, a threaded valve stem for said needle valve threaded in said bushing in the top wall of the casing for adjusting the valve to regulate the discharge of insecticide to be changed into fog, fog generating means positioned in the casing comprising a heated plate for vaporizing insecticide delivered thereto from said tube, and a blower connected by a plurality of interconnected tube sections opening to the ambient atmosphere, the intermediate tube section comprising an air and vapor mixing chamber formed with aspiring openings at the top of said fog generating means.

3. An insecticide fog producer comprising a casing having air inlet openings, an insecticide reservoir supported from the interior side of the top of the casing between said openings, a dispensing tube connected to the reservoir and extending from the interior of the reservoir part way toward the bottom of said casing, valve means in the end of the said tube in the reservoir, means for adjusting said valve to regulate the discharge of insecticide to be converted into fog, fog generating means positioned in the casing comprising a heated plate for vaporizing insecticide delivered thereto from said tube, and means for dispensing said vaporized insecticide by aspiration from the casing as an insecticide fog.

GEORGE W. McINTIRE.

References Cited in the file of this patent

UNITED STATES PATENTS

| Number | Name | Date |
|---|---|---|
| 404,240 | Williams | May 28, 1889 |
| 1,081,463 | Pentz | Dec. 16, 1913 |
| 1,346,471 | Slater | July 13, 1920 |
| 1,999,265 | Tiscornia | Apr. 30, 1935 |
| 2,313,976 | Sullivan et al. | Mar. 16, 1943 |

FOREIGN PATENTS

| Number | Country | Date |
|---|---|---|
| 262,716 | Switzerland | July 31, 1949 |